US009862189B2

(12) United States Patent
Okano et al.

(10) Patent No.: US 9,862,189 B2
(45) Date of Patent: Jan. 9, 2018

(54) METHOD FOR MANUFACTURING LIQUID EJECTION HEAD

(71) Applicant: CANON KABUSHIKI KAISHA, Tokyo (JP)

(72) Inventors: Akihiko Okano, Fujisawa (JP); Takumi Suzuki, Tokohama (JP); Tamaki Sato, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/200,377

(22) Filed: Jul. 1, 2016

(65) Prior Publication Data

US 2017/0008289 A1 Jan. 12, 2017

(30) Foreign Application Priority Data

Jul. 10, 2015 (JP) ................................ 2015-138695

(51) Int. Cl.

| | |
|---|---|
| ***G01D 15/00*** | (2006.01) |
| ***G11B 5/127*** | (2006.01) |
| ***B41J 2/16*** | (2006.01) |

(52) U.S. Cl.

CPC ........... *B41J 2/1628* (2013.01); *B41J 2/1603* (2013.01); *B41J 2/1631* (2013.01); *B41J 2/1639* (2013.01)

(58) Field of Classification Search

USPC ........................................................ 216/27

See application file for complete search history.

(56) References Cited

U.S. PATENT DOCUMENTS

| | | | |
|---|---|---|---|
| 4,657,631 A | 4/1987 | Noguchi | |
| 4,775,445 A | 10/1988 | Noguchi | |
| 6,241,335 B1 | 6/2001 | Suzuki | |
| 6,716,767 B2 | 4/2004 | Shih et al. | |
| 8,191,260 B2 | 6/2012 | Kato et al. | |
| 8,434,229 B2 | 5/2013 | Okano et al. | |
| 8,613,141 B2 | 12/2013 | Okano et al. | |
| 9,168,749 B2 | 10/2015 | Saito et al. | |
| 2017/0008290 A1 * | 1/2017 | Okano | B41J 2/1631 |

FOREIGN PATENT DOCUMENTS

JP 6-45242 B2 6/1994

OTHER PUBLICATIONS

Okano et al., U.S. Appl. No. 15/200,367, filed Jul. 1, 2016.
Ishikawa et al., U.S. Appl. No. 15/266,117, filed Sep. 15, 2016.

* cited by examiner

*Primary Examiner* — Roberts Culbert
(74) *Attorney, Agent, or Firm* — Fitzpatrick, Cella, Harper & Scinto

(57) ABSTRACT

There is provided a method for forming a smooth resin layer on a substrate having a concavo-convex portion in manufacturing a liquid ejection head by a casting method. To achieve this, after forming an opening pattern on the resin layer formed on the substrate, a mold is brought into contact with the resin layer at a predetermined pressure so as to smooth a surface of the resin layer.

20 Claims, 5 Drawing Sheets

METHOD FOR MANUFACTURING LIQUID EJECTION HEAD

BACKGROUND OF THE INVENTION

Field of the Invention

The present invention relates to a method for manufacturing a liquid ejection head.

Description of the Related Art

Like ink jet print heads, some liquid ejection heads which eject liquid as droplets from a plurality of elements are configured to have a substrate having elements for generating ejection energy arranged thereon, and a resin layer laminated on the substrate, the resin layer having formed thereon a flow path for guiding the liquid to each of the elements.

Japanese Patent Publication No. H06-45242 (1994) explains a process of manufacturing such a liquid ejection head by a casting method. More specifically, first, on a substrate having energy generating elements arranged thereon, a mold of an ink flow path is patterned by using a photosensitive material. Then, the formed mold pattern is coated with a resin and the resultant is set. Furthermore, after forming an ejection port which is in communication with the mold of the flow path on the coated member, the photosensitive material used for the mold pattern is removed. Accordingly, an area resulting from the removal of the photosensitive material forms a flow path, and a liquid ejection head having arranged therein an energy generating element, a liquid path for guiding liquid to the energy generating element, and an ejection port for ejecting the liquid is completed.

Meanwhile, U.S. Pat. No. 6,716,767 discloses a method for preventing concavo-convex portions from being generated also on a resin surface in accordance with a plurality of concavo-convex portions formed on a surface of a substrate when a casting method is used to coat the substrate with a resin having a high viscosity. More specifically, there is explained a process including providing various kinds of materials for adjusting steps on the substrate, applying the resin having a high viscosity to the surface of the substrate, further, bringing a mold having a smooth surface into contact with an upper surface of a resin layer, and then allowing the resin layer to be set.

SUMMARY OF THE INVENTION

According to a first aspect of the present invention, there is provided a method for manufacturing a liquid ejection head including a substrate having formed thereon an energy generating element, wiring for supplying power to the energy generating element, and a supply port for supplying liquid, the substrate having laminated thereon a flow path forming member on which a flow path for guiding the liquid supplied from the supply port to the energy generating element is formed, the method comprising: a step for forming a resin layer by applying a resin for forming an area to be the flow path on the substrate; an opening pattern forming step for forming an opening pattern to be a concave portion on the resin layer; and a smoothing step for smoothing a surface of the resin layer by bringing a smoothing member into contact with the resin layer on which the opening pattern is formed at a predetermined pressure.

According to a second aspect of the present invention, there is provided a method for smoothing a surface of a resin layer on a substrate, the method comprising: a step for forming a resin layer by applying a resin on the substrate; an opening pattern forming step for forming an opening pattern to be a concave portion on the resin layer; and a smoothing step for smoothing the surface of the resin layer by bringing a smoothing member into contact with the resin layer on which the opening pattern is formed at a predetermined pressure.

Further features of the present invention will become apparent from the following description of exemplary embodiments (with reference to the attached drawings).

DESCRIPTION OF THE EMBODIMENTS

By the way, in a liquid ejection head of a printing apparatus required to print an image with a high resolution and a high definition, energy generating elements, wirings for supplying power to the energy generating elements, and holes serving as a part of a flow path are formed on a substrate in a high-density and complicated manner. As a result, a plurality of concavo-convex portions having different heights and widths are laid out on the surface of the substrate with an unbalanced density. Therefore, even if the method disclosed in U.S. Pat. No. 6,716,767 is used, a surface of a resin layer cannot be sufficiently smoothed, which may cause a variation in ejection states of a plurality of ejection elements at or beyond an acceptable level.

The present invention has been made to solve the above problem. Accordingly, an object of the present invention is to provide a method for forming a smooth resin layer on a substrate having a concavo-convex portion by using a casting method.

First Embodiment

Figure 1:
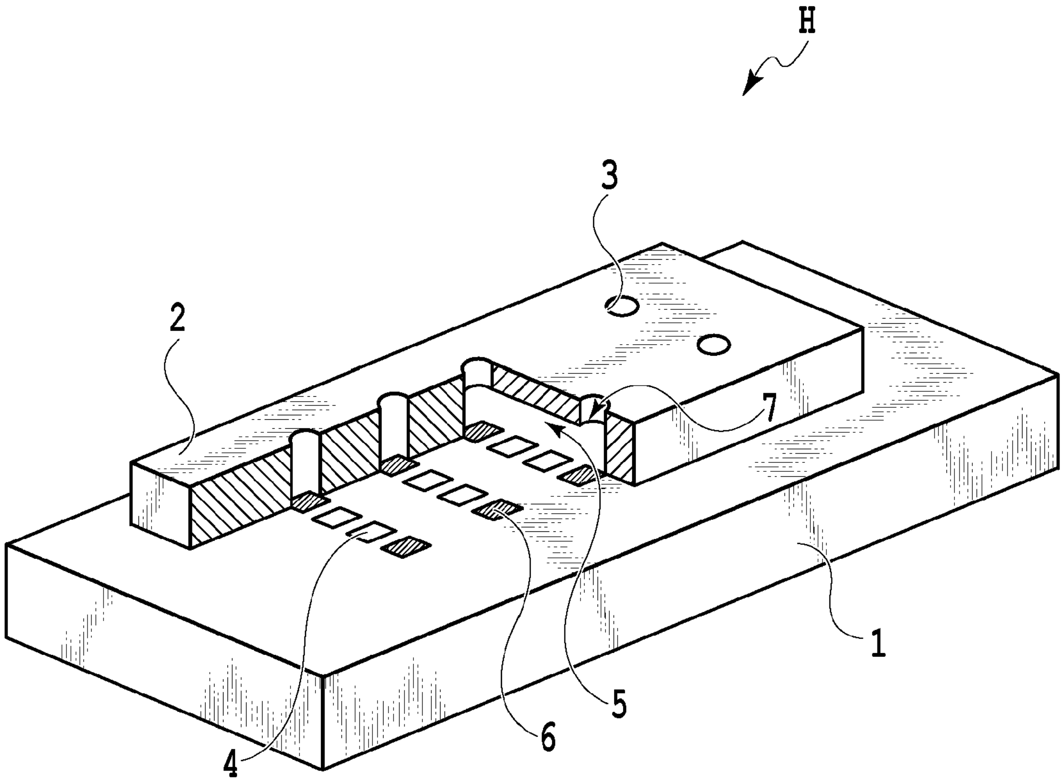
FIG. 1 is a schematic perspective view of an ink jet print head.

FIG. 1 is a schematic perspective view of an ink jet print head H (hereinafter referred to simply as a print head) which can be used as a liquid ejection head of the present invention. The print head H includes a substrate 1 on which a plurality of electrothermal transducers serving as energy generating elements 6, wiring (not shown) for supplying energy to the energy generating elements 6, and a supply port 4 formed adjacent to the wiring are formed, and a flow path forming member 2 made of a resin member laminated on the substrate 1. Ink supplied from a back surface of the substrate 1 via the supply port 4 flows into a flow path 5 formed on the flow path forming member 2 and is guided to a pressure chamber 7 corresponding to each of the energy generating elements 6 arranged with predetermined pitches. Then, if a predetermined voltage pulse is applied to the energy generating element 6, film boiling occurs in the ink in the pressure chamber 7, and the ink is ejected as a droplet from an ejection port 3 by a growing energy of generated bubbles.

Figure 2:
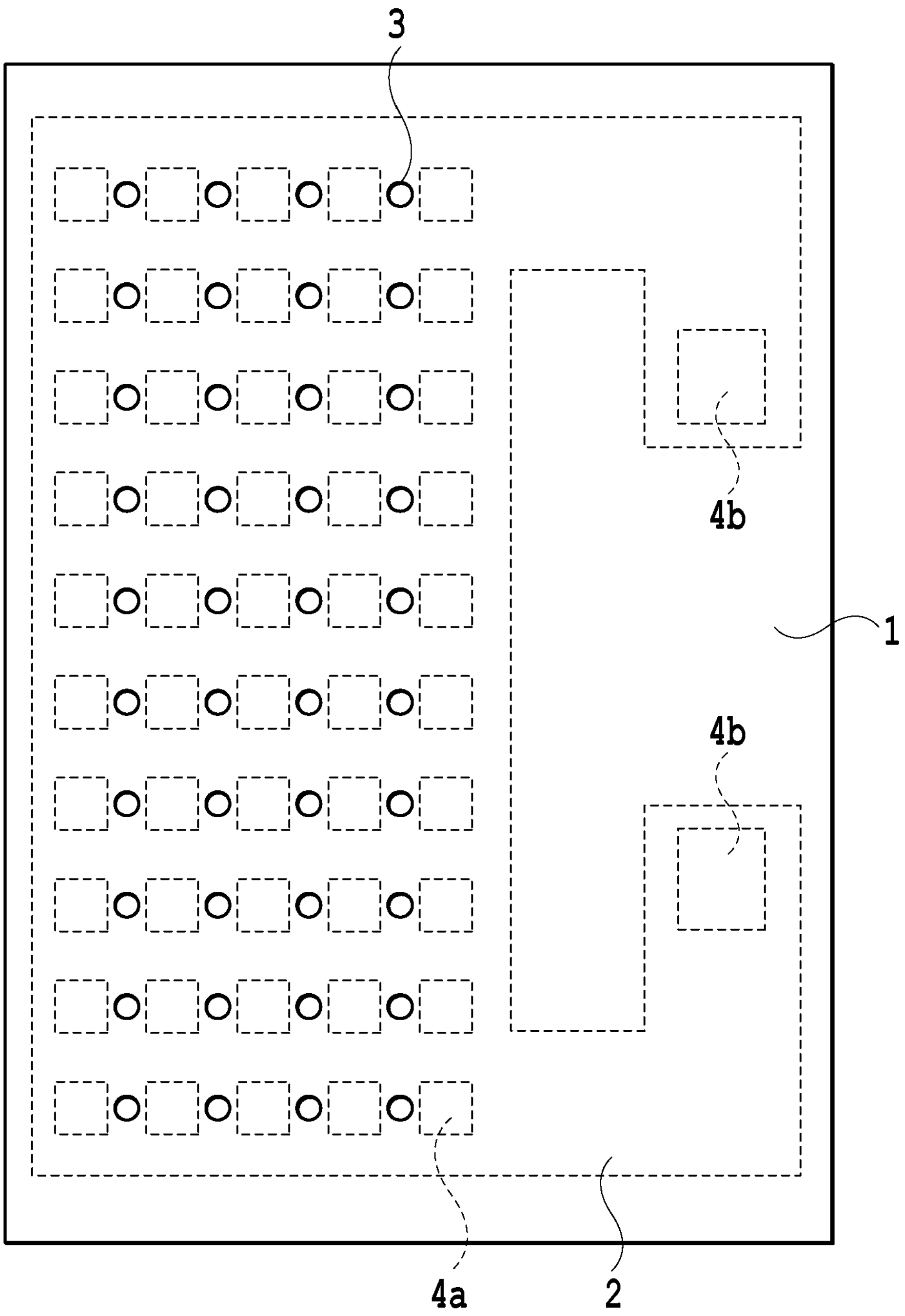
FIG. 2 is a view showing another example of the ink jet print head.

FIG. 2 is a view showing an example of the ink jet print head H having a structure different from the one shown in FIG. 1. In this example, the plurality of ejection ports 3 are arranged widely on an XY plane, and there are provided a number of supply ports 4*a* being relatively small in size arranged in positions corresponding to the ejection ports 3 and supply ports 4*b* being relatively large in size arranged commonly to the plurality of ejection ports 3. The opening size of each of the supply ports 4*a* and 4*b* is adjusted in view of ink flow path resistance. In both of the structures shown in FIG. 1 and FIG. 2, the concavo-convex portions having various sizes and shapes exist on the substrate 1 with an uneven density.

By the way, even before wiring or the like is formed, the substrate 1 generally used in the manufacture of semiconductors already has a concavo-convex portion of a few μm or greater if large. If wiring and an electrothermal transducer are further laid out on the substrate 1 as shown in FIG. 1 and FIG. 2, a concavo-convex portion of 10 μm or greater is eventually generated. In a state in which the sizes of the concavo-convex portions are not uniform on the substrate, even if a constant pressure is applied to the mold which is brought into contact with the surface of the resin layer in the casting method, a degree of smoothing varies depending on an area, and the concavo-convex portion may not be sufficiently removed. As shown in FIG. 2, in particular, in a case where there is an imbalance in the distribution or the sizes of the supply ports, the distribution of the concavo-convex portions may be unbalanced in the same liquid ejection head.

Figure 3A:
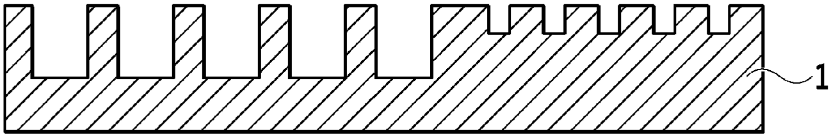
FIGS. 3A to 3D are views for explaining a mechanism of generating a concavo-convex portion on a surface of a flow path forming member.

FIGS. 3A to 3D are schematic views for explaining a mechanism of generating the concavo-convex portion on the surface of the flow path forming member 2 as a result of using a conventional common casting method. FIG. 3A is a cross-sectional view of the substrate 1 before a photosensitive resin for forming an area to be a flow path is applied. On the surface of the substrate 1, concavo-convex portions having different sizes are formed. For the sake of simplicity, FIG. 3A shows a state in which a left area has a relatively large concave portion like a supply port and a right area has a relatively small concave portion.

Figure 3B:
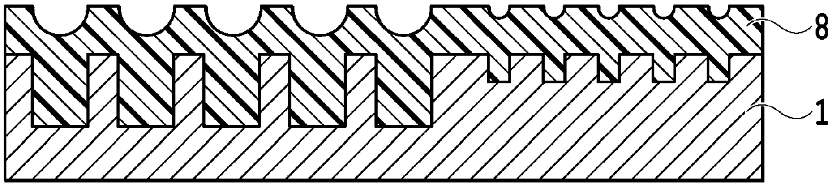

FIG. 3B shows a state in which a photosensitive resin is given (applied in this example) and a photosensitive resin layer 8 is formed. A liquid photosensitive resin having a relatively high viscosity flows into the concave portion formed on the surface of the substrate 1, and a concavo-convex portion is formed on the surface in accordance with the concavo-convex portion of the substrate 1. In such a concavo-convex portion, as the photosensitive resin has a higher viscosity, a self-leveling performance is lower, and thus the concavo-convex portion becomes distinguished. In general, the above phenomenon can be confirmed with a viscosity in the range of 100 to 10000 mPas. Also in a case where the photosensitive resin has a low solid concentration, a concavo-convex portion tends to be easily formed because a difference in film-thinning occurs in accordance with a difference in a resin amount. In general, the phenomenon as shown in FIG. 3B can be confirmed for a solid concentration in the range of 10 to 30 wt %. Furthermore, as an aspect ratio of the concave portion increases, that is, as a depth with respect to a length of a bottom surface of the concave portion increases, the concavo-convex portion becomes distinguished. In FIG. 3B, the left area having a relatively large concavo-convex portion formed on the substrate 1 has a large concavo-convex portion also on the applied surface, whereas the right area having a relatively small concavo-convex portion formed on the substrate 1 has a small concavo-convex portion also on the applied surface.

Figure 3C:
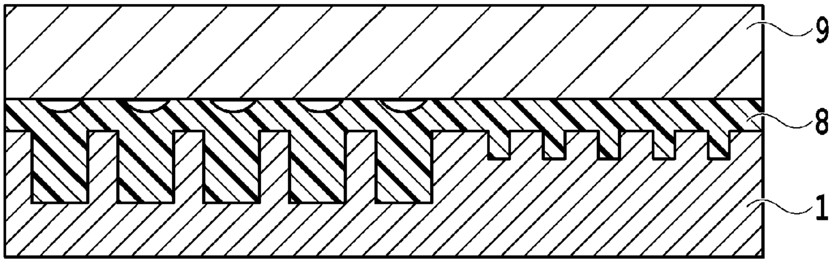
Figure 3D:
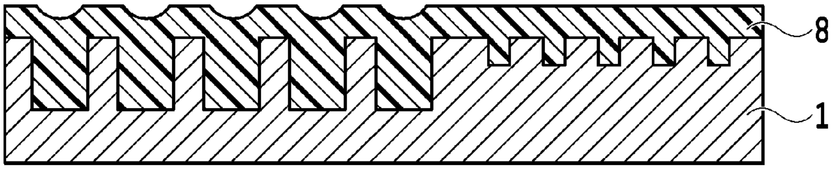

FIG. 3C shows a state in which a mold 9 having a smooth surface is brought into contact with the photosensitive resin layer 8 shown in FIG. 3B from an upper surface of the photosensitive resin layer 8 so as to apply a constant force to the entire area of the surface. In the right area having a relatively small concavo-convex portion, a relatively small pressure allows a sufficient volume of the resin to flow to fill the concave portion, whereby the concavo-convex portion disappears. Meanwhile, in the left area having a relatively large concavo-convex portion, a pressure needed to cause a sufficient volume of the resin to flow to fill the concave portion cannot be obtained, whereby the concave portion remains. As a result, even after the mold 9 is separated, as shown in FIG. 3D, the concave portion remains in the left area of the resin layer 8. If the upper surface of the photosensitive resin layer 8 is coated with the resin to be the flow path forming member 2, the flow path obtained by removing the photosensitive resin layer 8 in a subsequent step includes the concavo-convex portion, causing variations in the ejection states of the ejection elements.

At this time, if a pressure on the mold 9 is increased or a time to apply the pressure is made longer, it is also possible to make the concave portion in the left area smaller or disappear. In this case, however, a yield may decrease and a tact time may increase because of deformation of the mold 9 or the substrate 1.

Figures 4A, 4B, 4C, 4D, 4E, 4F, 4G, 4H, 4I:
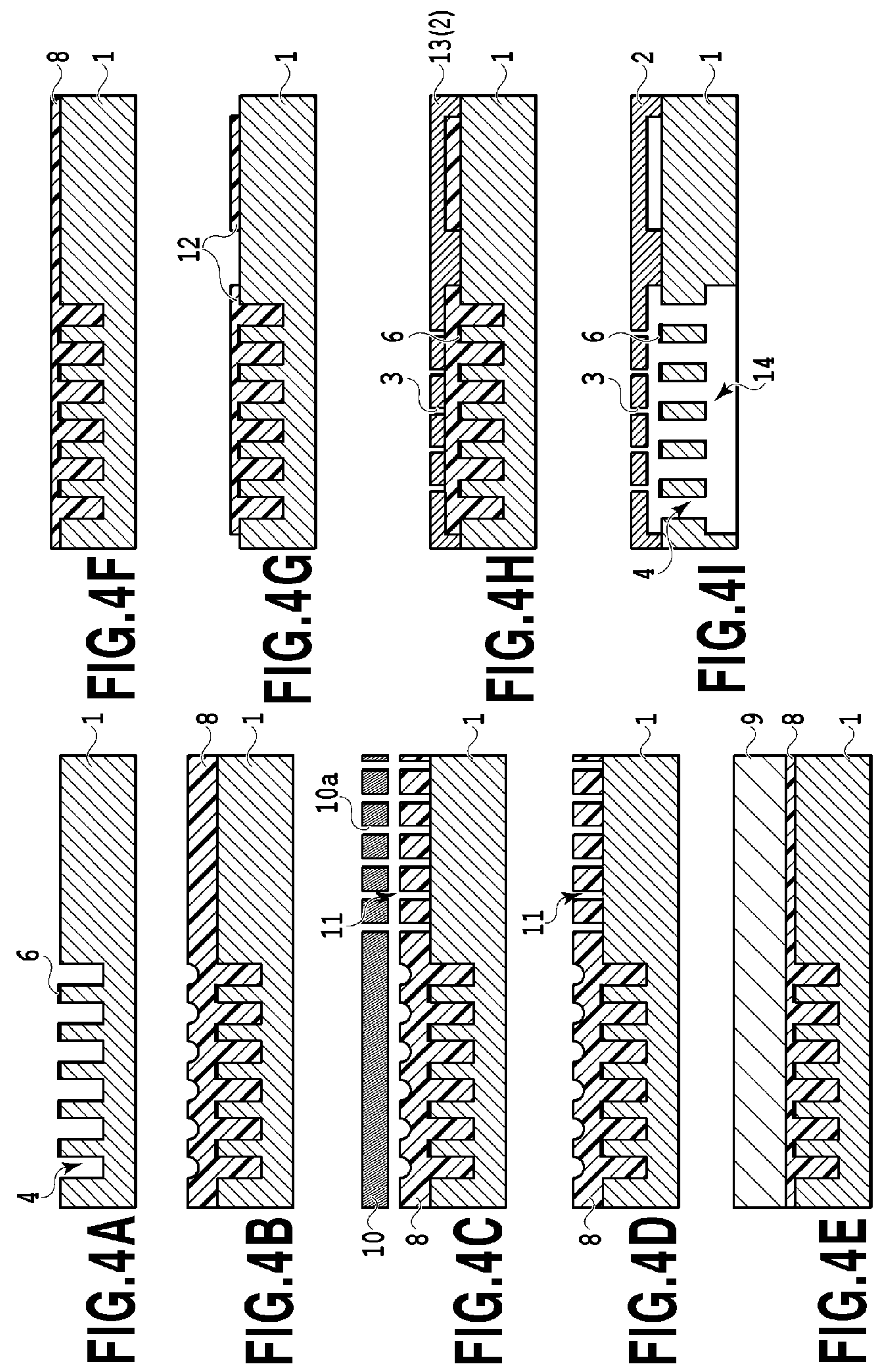
FIGS. 4A to 4I are views of a manufacturing process of a liquid ejection head according to a first embodiment.

FIGS. 4A to 4I are views for explaining a manufacturing process of a liquid ejection head according to the present embodiment. FIG. 4A is a cross-sectional view of the substrate 1 before a resin for forming a flow path area is applied. On the substrate 1, the energy generating element 6, the wiring for supplying power to the energy generating element 6, and the supply port 4 for supplying liquid to the area of the energy generating element 6 are already formed. In this example, FIG. 4A shows a state in which a plurality of concave portions corresponding to the plurality of supply ports 4 are formed in the left area, and a smooth surface is formed in the right area.

FIG. 4B shows a state in which, on the substrate 1, a positive photosensitive resin for forming a flow path area in a subsequent step is applied, and the photosensitive resin layer 8 is formed. A liquid photosensitive resin having a relatively high viscosity flows into the concave portion formed on the surface of the substrate 1, and a concavo-convex portion is formed on the surface in accordance with the concavo-convex portion of the substrate 1.

Next, as shown in FIG. 4C, a mask 10 having a plurality of openings 10*a* is disposed on the resin layer 8, and in this state, the resin layer 8 is exposed and developed. In the present embodiment, the openings 10*a* are provided only in the right area of the mask 10, and no opening 10*a* is provided in the left area. Accordingly, in the resin layer 8, a plurality of opening patterns 11 are formed in the positions of the openings 10*a* only in the right area. As a result, as shown in FIG. 4D, the left area of the photosensitive resin layer 8 becomes an area having the concavo-convex portion, and the right area becomes an area having the opening pattern 11.

Next, as shown in FIG. 4E, the mold 9 having a smooth surface is brought into contact with the photosensitive resin layer 8 so as to apply a uniform force to the entire area of the surface of the photosensitive resin layer 8. At this time, a volume of the resin caused to flow to fill the concave portion is substantially the same in the right area having the opening pattern 11 and in the left area originally having the relatively large concavo-convex portion, and also the pressure needed to obtain the smooth surface is substantially the same in the right area and in the left area. In other words, the opening pattern 11 is formed in the right area in accordance with the volume of the concave portion in the left area so that the pressure needed for smoothing is substantially the same in the right and left areas, and the opening pattern 11 is formed so that the concavo-convex portions are distributed uniformly in the resin layer. Furthermore, the opening 10*a* for forming such an opening pattern 11 is provided in advance in the mask 10. As a result, by pressing the mold 9 on the surface of the photosensitive resin layer 8 with a pressure to fill the opening pattern 11 in the right area, the concavo-convex portion in the left area also disappears almost at the same time as the opening pattern 11 in the right area disappears, and it is possible to obtain the photosensitive resin layer having the smooth surface as shown in FIG. 4F. The concavo-convex portions of the resin layer do not always need to be distributed uniformly, but distribution close to the uniform distribution is preferable.

Incidentally, it is preferable that a contacting step as shown in FIG. 4E be performed in a vacuum environment to prevent extra air from entering between members or to avoid a position displacement caused by a vapor pressure in the resin layer 8. Furthermore, heating the photosensitive resin layer 8 to or higher than a glass transition point can increase flowability of the resin layer 8 and form the smooth surface in a shorter time. As for the mold 9, it is preferable to have a sufficient rigidity to avoid deformation or the like caused by a contact pressure. Furthermore, it is also effective to interpose an elastic body such as a rubber sheet, a sponge sheet, a graphite sheet, and the like around the mold 9 and the substrate 1 between which the resin layer 8 is sandwiched so as to balance load distribution in bringing the mold 9 into contact with the resin layer 8. In addition, to promptly separate the mold 9 after the contact from the resin layer 8, a mold release agent may be provided in advance on a contact surface of the mold 9. Incidentally, it is also possible to advance in stages the above-described steps for smoothing the photosensitive resin layer 8 in FIGS. 4C to 4F by repeating part or all of the steps, while making fine adjustments.

Once the smooth surface as shown in FIG. 4F is obtained, then, a flow path surface is exposed and developed by using a mask (not shown) on which a flow path pattern is formed. This can remove an area of the photosensitive resin layer 8 that is not masked, and a flow path mold pattern 12 as shown in FIG. 4G remains on the substrate 1.

Then, after a coated resin layer is formed by coating with a new resin layer, the coated resin layer is exposed by using a mask (not shown) on which a pattern for ejection ports is formed, so that, as shown in FIG. 4H, the flow path forming member 2 having an ejection port 3 in a position facing the energy generating element 6 is completed. Furthermore, after forming a common supply port from the back surface of the substrate 1, by removing the flow path mold pattern 12, an ink flow path is formed which extends from the common supply port 14 through the supply port 4 to the ejection port 3, and the liquid ejection head of the present embodiment is completed.

Figure 5A:
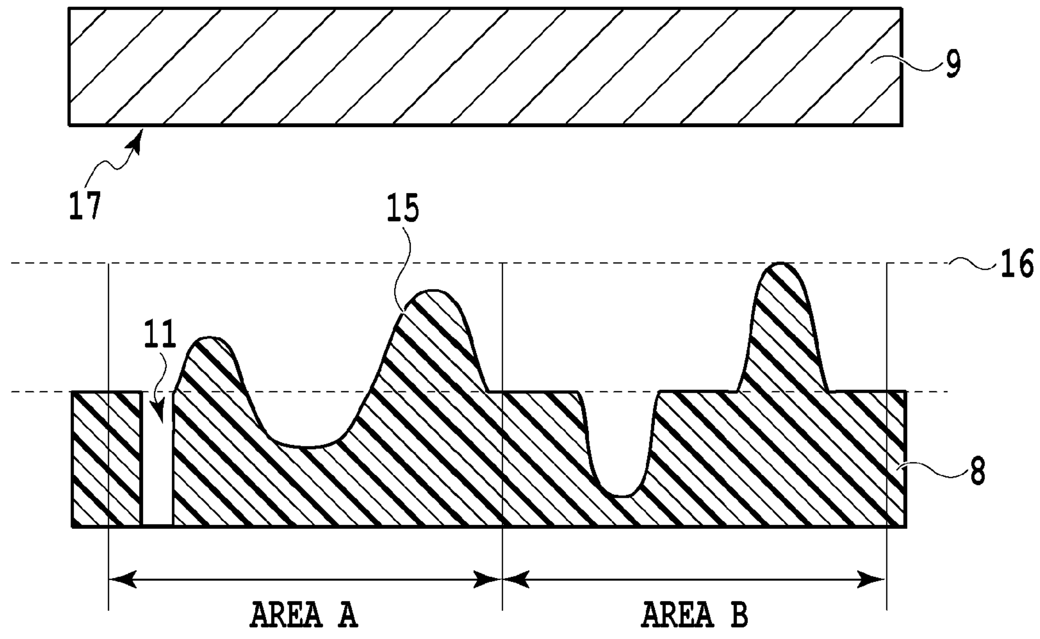
FIGS. 5A and 5B are views for explaining a function and an effect of an opening pattern.
Figure 5B:
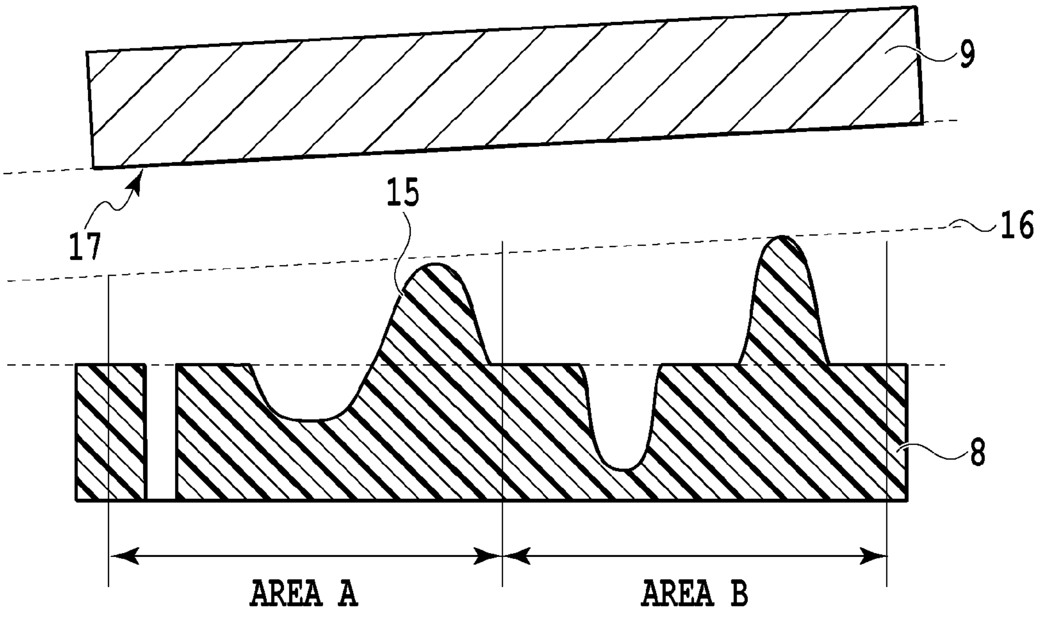

FIGS. 5A and 5B are views for explaining in detail a function and an effect of forming the opening pattern 11 as illustrated in FIGS. 4C to 4E. In this example, FIGS. 5A and 5B show a state in which a concavo-convex portion exists both in a unit area A and a unit area B which have the same size. With reference to FIG. 5A, a height of a convex portion in the area A is lower than a height of a convex portion in the area B and a depth of a concave portion in the area A is smaller than a depth of a concave portion in the area B. That is, a flow rate of a resin material needed to fill the concave portion in the area A is less than a flow rate needed to fill the concave portion in the area B, and before the opening pattern 11 is formed, a pressure needed to form a smooth surface is unbalanced between the area A and the area B. In the present embodiment, the opening pattern 11 is formed so as to eliminate such imbalance.

More specifically, the opening pattern 11 is formed in an area having a smaller volume of a space between a top surface 16 of a convex portion parallel to the surface of the substrate 1 and a surface 15 of the resin layer having a concavo-convex portion so that the volume of the space becomes substantially the same in the area A and the area B. In the case of FIG. 5A, since the space in the area A is smaller than the space in the area B, the opening pattern 11 is formed in the side of the area A to have substantially the same spaces in both areas. This can make the pressure on the mold 9 as well as the flow rate of the resin for smoothing the surface in the area A and those in the area B substantially the same, allowing formation of a smooth surface at substantially the same timing in both areas.

By the way, to obtain a preferable smoothness, as shown in FIG. 5A, it is preferable that a contact surface 17 of the mold 9 be in contact with the resin layer 8 while being parallel to the surface of the substrate 1. As shown in FIG. 5B, however, the mold 9 must occasionally be brought into contact with the substrate 1 in an inclined manner, and in this case, the flow rate to smooth the surface of the resin layer 8 is different from that in the case shown in FIG. 5A. In such a situation, the opening pattern 11 may be formed so that the volume of the space between the top surface 16 parallel to the contact surface of the mold 9 and including the top of the convex portion and the surface 15 of the resin layer having the concavo-convex portion becomes substantially the same in the area A and the area B.

Incidentally, in the above, for the sake of simplicity, a description has been given of an example of equalizing the volume of the space in two areas: the area A and the area B. In actuality, however, the volume of the space needs to be adjusted in more unit areas, and it is difficult to completely equalize the volume of the space among these areas. According to the study by the inventors of the present invention, it has been confirmed that a variation of about 1% or less in the volume of a space V in each area can obtain a smooth surface with almost no problem. However, such a value depends on material of the mold or the type of resin to be used, and the value cannot be determined definitely.

The space in each unit area can be adjusted by both the volume of the opening pattern 11 and the number of the opening patterns 11 to be formed. That is, the volume of the opening pattern 11 is defined by multiplying a cross-sectional area by a thickness of the resin, and accordingly, the space in each unit area can be adjusted by an area of a hole and the number of holes to be opened in advance in the mask 10. At this time, setting the volume of one of the opening patterns 11 as small as possible can adjust the space of each area with high precision by the number of opening patterns 11 to be formed. However, the present embodiment is not limited to this. An opening pattern having a different shape for each unit area may be formed. A preferable shape of a hole is a circle, but the shape is not limited to this.

The size of the unit area is not particularly limited. The size may be appropriately determined according to physical properties such as a viscosity or a glass transition point of a photosensitive resin and conditions (a temperature, a pressure, a time period, and the like) when bringing the mold 9 into contact with the resin layer 8. In general, a flow amount of the resin with a high viscosity tends to be small, and it is preferable to set a relatively small unit area. Furthermore, it is preferable to set a relatively small unit area since a flow amount tends to be small also in a case where the conditions of bringing the mold 9 into contact with the resin layer 8 are a low temperature, a low pressure, and a short time period. In the case of using a resin having a glass transition point of 100° C., a viscosity of 500 to 1000 cP, and a solid concentration of 10 to 20%, and bringing the mold into contact with the resin layer 8 under the conditions of a temperature of 100° C., a pressure of 10 MPa, and a time period of 30 seconds, it is preferable to set a unit area of 100 μm×100 μm or less.

Note that when applying the photosensitive resin, a concavo-convex portion which is nothing to do with the concavo-convex portion on the substrate 1 may be generated due to an influence of striation or drying. In this case, the opening pattern 11 may be formed in an appropriate position in view of tendency of the concavo-convex portion.

Verification Example

With reference to FIGS. 4A to 4I, a verification example of a manufacturing process of an ink jet print head will be specifically described.

First, as a substrate 1, a silicon substrate 1 having a plurality of heaters for ejecting ink, a driver for driving the heaters, and a logic circuit formed thereon was prepared (FIG. 4A). Then, a resin layer 8 made of a photodegradable positive resist was formed on the substrate (FIG. 4B). As the photodegradable positive resist, polymethyl isoproprapenyl ketone (ODUR-1010 available from Tokyo Ohka Kogyo Co., Ltd.) having a resin concentration of 20 wt % was prepared. Then, polymethyl isoproprapenyl ketone was applied to the substrate 1 by spin coating and prebaked on a hot plate at a temperature of 120° C. for three minutes, then in a nitrogen-substituted oven at a temperature of 150° C. for 30 minutes. As a result, a positive resist layer having a thickness of 5 μm was obtained.

Next, by using Deep-UV exposure machine UX-3000 (trade name) available from USHIO INC., the resin layer 8 was irradiated with Deep-UV light at an exposure rate of 18000 mJ/cm$^2$ with a mask 10 on which an opening pattern is rendered. Then, the resin layer 8 was developed by using a methyl isobutyl ketone (MIBK) (nonpolar solvent)/xylene=2/3 solution, and subjected to rinse processing by using xylene, whereby an opening pattern 11 was formed on the substrate 1 (FIG. 4D). At this stage, a volume of a space in each unit area (100 μm×100 μm) was confirmed to have a variation of 1% or less.

Furthermore, in a vacuum chamber, a mold 9 having a contact surface 17 polished to be flat was disposed on the resin layer 8, and by using press machine (ST-200) available from TOSHIBA MACHINE CO., LTD., the substrate 1 and the resin layer 8 were heated and pressurized from top and bottom (FIG. 4E). Then, after confirming that the concavo-convex portion of the resin layer 8 and the opening pattern 11 were filled, the mold 9 was separated from the resin layer 8 (FIG. 4F).

Then, by using Deep-UV exposure machine UX-3000 (trade name) available from USHIO INC., the resin layer 8 was irradiated with Deep-UV light at an exposure rate of 18000 mJ/cm$^2$ with a mask on which a flow path mold pattern was rendered. Then, the resin layer 8 was developed by using a methyl isobutyl ketone (MIBK) (nonpolar solvent)/xylene=2/3 solution, and subjected to rinse processing by using xylene, whereby a flow path mold pattern 12 was formed on the substrate 1 (FIG. 4G).

Next, on the flow path mold pattern 12, a photocurable resin layer 13 was formed by coating with a photocurable resin. At this time, as the photocurable resin, a resist solution of a composition as follows was used.

| | |
|---|---|
| EHPE-3150 (trade name, available from Daicel Corporation) | 100 parts by weight |
| HFAB (trade name, available from Central Glass Co., Ltd.) | 20 parts by weight |
| A-187 (trade name, available from NUC Corporation) | 5 parts by weight |
| SP170 (trade name, available from ADEKA CORPORATION) | 2 parts by weight |
| Xylene | 80 parts by weight |

Then, the above resist solution was applied to the flow path mold pattern 12 by spin coating and prebaked on a hot plate at a temperature of 90° C. for three minutes. As a result, the photocurable resin layer 13 having a thickness of 10 μm. (on a flat plate) was formed.

Furthermore, by using mask aligner MPA600FA (available from Canon Inc.), after being pattern-exposed at an exposure rate of 3000 mJ/cm$^2$ by using a mask on which an ejection port pattern was rendered, the photocurable resin layer 13 was subjected to post exposure bake (PEB) at a temperature of 90° C. for 180 seconds and allowed to cure. Then, the photocurable resin layer 13 was developed by using a methyl isobutyl ketone/xylene=2/3 solution, and subjected to rinse processing by using xylene, whereby a plurality of ejection ports 3 were formed on the photocurable resin layer 13 (FIG. 4H).

Next, a protection layer was applied to the surface of the substrate 1 to form an etching mask of a slit type by a positive resist on a back surface of the substrate 1, and by performing dry etching with Pegasus available from SUMITOMO PRECISION PRODUCTS Co., Ltd., a common supply port 14 was formed. Furthermore, after removing the protection layer, by using Deep-UV exposure machine UX-3000 (trade name) available from USHIO INC., the entire surface of the common supply port 14 was exposed at an exposure rate of 7000 mJ/cm$^2$, and the resin forming the flow path mold pattern 12 was dissolved. Then, by immersing the flow path mold pattern 12 in methyl lactate while giving ultrasound waves, the flow path mold pattern 12 was removed, whereby the ink jet print head was completed.

In the ink jet print head manufactured by the above method, it was possible to obtain an extending liquid path having substantially a constant height. Accordingly, in a case where the ink jet print head was mounted on a predetermined printing apparatus and a printing operation was performed, ejection operations of the plurality of ejection ports could be stabilized, and a high-quality output image was confirmed.

Second Embodiment

Also in the present embodiment, like the first embodiment, an ink jet print head is manufactured according to FIGS. 4A to 4I. In the present embodiment, however, an opening pattern 11 is formed by a dry etching method.

First, as a substrate 1, a silicon substrate 1 having a plurality of heaters for ejecting ink, a driver for driving the heaters, and a logic circuit formed thereon is prepared (FIG. 4A). A resin layer 8 made of a photodegradable positive resist is formed on the substrate (FIG. 4B).

Next, an etching-resistant resist layer (THMR-IP5700, available from TOKYO OHKA KOGYO CO., LTD.) serving as an etching mask is formed on the resin layer 8. Then, by the exposure by using a photomask on which an opening pattern is rendered, the etching-resistant resist layer is removed except a mask area, and a pattern of the etching-resistant resist layer is formed on the positive resist layer. Then, by performing dry etching processing, the positive resist other than an area in which a pattern is formed by the etching-resistant resist layer is removed, and further, by removing the remaining etching-resistant resist layer, the opening pattern 11 is formed on the positive resist layer. The subsequent steps, that is, the steps of FIGS. 4E to 4I, are performed in the same manner as in the first embodiment.

In the ink jet print head manufactured by the above method, it is possible to obtain a flow path surface having a uniform height in any ejection port area. In a case where the ink jet print head is mounted on a predetermined printing apparatus and a printing operation is performed, uniform liquid droplets can be stably ejected from each ejection port, and a high-quality output image is confirmed.

According to the above-described embodiment, before the smooth surface of the mold 9 is brought into contact with the surface of the resin layer 8, the opening pattern 11 to be a concave portion is formed in an area having relatively a few concave portions so that concavo-convex portions are formed substantially uniformly in the entire area of the resin layer 8. Accordingly, when the mold 9 is brought into contact with the surface of the resin layer 8 and pressurized in a subsequent step, it is possible to make a flow rate of the resin per unit area substantially uniform in the entire area of the contact surface, allowing the surface of the resin layer 8 to be smoothed efficiently and reliably.

It should be noted that in the above, as the resin for forming the flow path mold pattern 12, a positive photosensitive resin is used in terms of easiness of removal, a negative resin may also be used. Furthermore, the resin may be heated for liquidization by using a thermosensitive resin instead of the photosensitive resin.

Descriptions have been given of an example of forming the opening pattern 11 on the resin layer 8 by the exposure step by using the mask 10 in the first embodiment and of an example of forming the opening pattern 11 on the resin layer 8 by dry etching in the second embodiment, but the formation of the opening pattern of the present invention is not limited to these methods. For example, before the mold 9 for facilitating smoothing is brought into contact, a desirable opening pattern 11 may be formed on the resin layer 8 by bringing a mold member having a convex portion that is the same shape as an opening pattern into contact with the resin layer 8 in a position in which an opening pattern is desired to be formed. In either case, as long as the opening pattern 11 can be formed so as to have concavo-convex portions uniformly in the entire area of the resin layer 8 before the mold 9 and the resin layer 8 are brought into contact with each other, any method for forming the opening pattern 11 is encompassed in the present invention.

Furthermore, in the above embodiment, the mold 9 having a smooth surface is brought into contact with the resin layer 8 as a smoothing member, but the present invention is not limited to this. For example, rotation and movement of a roller held at a constant height while being in contact with the surface of the resin layer 8 can also smooth the surface of the resin layer 8. Furthermore, it is also possible to use a method for facilitating liquidization of a resin by heating and a method for adjusting a solvent content of a resin for leveling the surface of the resin layer 8. As long as the opening pattern 11 is formed in advance on the resin layer 8 to have substantially uniform concavo-convex portions, any method can smoothly cause a resin to flow into the concave portion and produce an advantageous result of the present invention.

Furthermore, in the above embodiments, descriptions have been given of the examples of the ink jet print heads mounted on the printing apparatus, but the liquid ejection head of the present invention is applicable to various fields. Other than the printing apparatus, the ink jet print head may be mounted on a copier and a facsimile, and further on an industrial printing apparatus combined with various processing apparatuses. As a matter of course, liquid to be ejected is not limited to ink for printing an image, and for example, the present invention can be used for various applications such as for creating a biochip, printing an electronic circuit, and ejecting a drug in a spray form.

Further, the present invention is not limited to the method for manufacturing the liquid ejection head, and can be applied to a case where the surface of the resin layer formed on the substrate is desired to be smoothed. Examples of the process of manufacturing a semiconductor may include a process of smoothing the surface of the resin layer.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-138695, filed Jul. 10, 2015, which is hereby incorporated by reference wherein in its entirety.

What is claimed is:

1. A method for manufacturing a liquid ejection head including a substrate having formed thereon an energy generating element, wiring for supplying power to the energy generating element, and a supply port for supplying liquid, the substrate having laminated thereon a flow path forming member on which a flow path for guiding the liquid supplied from the supply port to the energy generating element is formed, the method comprising:

a step for forming a resin layer by applying a resin for forming an area to be the flow path on the substrate on which concavo-convex portions are present at an uneven density;

an opening pattern forming step for forming an opening pattern to be a concave portion on the resin layer; and a smoothing step for smoothing a surface of the resin layer by bringing a smoothing member into contact with the resin layer on which the opening pattern is formed at a predetermined pressure.

2. The method for manufacturing the liquid ejection head according to claim 1, wherein in the opening pattern forming step, the opening pattern is formed on the resin layer so that a volume of a space formed by a concavo-convex portion on the resin layer becomes substantially equal in a plurality of unit areas.

3. The method for manufacturing the liquid ejection head according to claim 2, wherein after the smoothing step, a variation in the volume of the space formed by the concavo-convex portion of the resin layer among the unit areas is 1% or less.

4. The method for manufacturing the liquid ejection head according to claim 1, wherein the resin is a photosensitive resin, and in the opening pattern forming step, the opening pattern is formed on the resin layer by exposing and developing the resin layer by using a mask having a hole in a position in which the opening pattern is to be formed.

5. The method for manufacturing the liquid ejection head according to claim 1, wherein in the opening pattern forming step, the opening pattern is formed on the resin layer by a dry etching method.

6. The method for manufacturing the liquid ejection head according to claim 1, wherein in the opening pattern forming step, the opening pattern is formed on the resin layer by bringing a member having a convex portion that is the same shape as the opening pattern into contact with the resin layer and pressurizing.

7. The method for manufacturing the liquid ejection head according to claim 1, wherein the smoothing member is a mold member having a smooth surface to be in contact with the resin layer.

8. The method for manufacturing the liquid ejection head according to claim 1, wherein in the smoothing step, the smoothing member as heated is brought into contact with the resin layer at a predetermined pressure.

9. The method for manufacturing the liquid ejection head according to claim 1, further comprising, after the smoothing step, the steps of:

forming a flow path mold pattern on the substrate by leaving the resin layer corresponding to an area to be the flow path;

on the flow path mold pattern, forming an ejection port for ejecting a liquid droplet after applying a resin to be the flow path forming member and allowing the resin to cure; and removing the flow path mold pattern.

10. A method for smoothing a surface of a resin layer on a substrate, the method comprising:

a step for forming a resin layer by applying a resin on the substrate on which concavo-convex portions are present at an uneven density;

an opening pattern forming step for forming an opening pattern to be a concave portion on the resin layer; and a smoothing step for smoothing the surface of the resin layer by bringing a smoothing member into contact with the resin layer on which the opening pattern is formed at a predetermined pressure.

11. The method according to claim 10, wherein in the opening pattern forming step, the opening pattern is formed on the resin layer so that a volume of a space formed by a concavo-convex portion on the resin layer becomes substantially equal in a plurality of unit areas.

12. The method according to claim 11, wherein after the smoothing step, a variation in the volume of the space formed by the concavo-convex portion of the resin layer among the unit areas is 1% or less.

13. The method according to claim 10, wherein the resin is a photosensitive resin, and in the opening pattern forming step, the opening pattern is formed on the resin layer by exposing and developing the resin layer by using a mask having a hole in a position in which the opening pattern is to be formed.

14. The method according to claim 10, wherein in the opening pattern forming step, the opening pattern is formed on the resin layer by a dry etching method.

15. The method according to claim 10, wherein in the opening pattern forming step, the opening pattern is formed on the resin layer by bringing a member having a convex portion that is the same shape as the opening pattern into contact with the resin layer and pressurizing.

16. The method according to claim 10, wherein the smoothing member is a mold member having a smooth surface to be in contact with the resin layer.

17. The method according to claim 10, wherein in the smoothing step, the smoothing member as heated is brought into contact with the resin layer at a predetermined pressure.

18. The method according to claim 10, further comprising, after the smoothing step, the steps of:

forming a flow path mold pattern on the substrate by leaving the resin layer corresponding to an area to be a flow path;

on the flow path mold pattern, forming an ejection port for ejecting a liquid droplet after applying a resin to be a flow path forming member and allowing the resin to cure; and removing the flow path mold pattern.

19. The method for manufacturing the liquid ejection head according to claim 1, wherein the concave portion on the resin layer is formed in accordance with the supply port of the substrate and the opening pattern.

20. The method for manufacturing the liquid ejection head according to claim 1, wherein the opening pattern forming step forms a plurality of opening patterns to be concave portions on the resin layer so that a size or a number of the opening patterns corresponding to a first area is larger than that corresponding to a second area where a number of supply ports formed on the substrate is larger than that in the first area.

* * * * *